United States Patent
Szczepanik et al.

(10) Patent No.: US 12,045,335 B2
(45) Date of Patent: Jul. 23, 2024

(54) SOFTWARE DISCOVERY WITHIN SOFTWARE PACKAGING AND DEPLOYMENT SYSTEMS

(71) Applicant: International Business Machines Corporation, Armonk, NY (US)

(72) Inventors: Grzegorz Piotr Szczepanik, Cracow (PL); Piotr Kalandyk, Zielonki (PL); Łukasz Józef Matyasik, Cracow (PL); Piotr Jan Kotara, Jodłownik (PL)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 17/706,714

(22) Filed: Mar. 29, 2022

(65) Prior Publication Data
US 2023/0315836 A1    Oct. 5, 2023

(51) Int. Cl.
G06F 21/00    (2013.01)
G06F 9/445    (2018.01)
G06F 16/14    (2019.01)
G06F 21/50    (2013.01)
(Continued)

(52) U.S. Cl.
CPC .......... G06F 21/51 (2013.01); G06F 9/44526 (2013.01); G06F 16/144 (2019.01); G06F 16/152 (2019.01); G06F 21/50 (2013.01); G06F 21/53 (2013.01)

(58) Field of Classification Search
None
See application file for complete search history.

(56) References Cited

U.S. PATENT DOCUMENTS 9,223,963 B2 * 12/2015 Dalcher ................ H04L 63/145
10,834,107 B1 * 11/2020 Paithane ............... G06F 21/554
(Continued)

FOREIGN PATENT DOCUMENTS

CN    111611580 A    9/2020

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Andrew J Steinle
(74) *Attorney, Agent, or Firm* — Michael A. Petrocelli (57) ABSTRACT

A computer-implemented method for software detection is disclosed. The computer-implemented method includes scanning a list of file systems present on a computer system and described by a respective mount point for a signature from a set of predetermined signatures. The computer-implemented method further includes responsive to detecting the signature from the set of predetermined signatures, selecting a particular plugin from a predetermined list of plugins based, at least in part, on the detected signature. The computer-implemented method further includes querying, using the plug-in, an operating environment of the filesystem for data indicative of software running in the operating environment. The computer-implemented method further includes determining software running in the operating environment based, at least in part, on the data returned from querying the operating environment of the filesystem.

17 Claims, 6 Drawing Sheets

(51) Int. Cl.
*G06F 21/51* (2013.01)
*G06F 21/53* (2013.01)

(56) References Cited

U.S. PATENT DOCUMENTS

| | | | |
|---|---|---|---|
| 2018/0027007 A1* | 1/2018 | Shah | H04L 67/02 |
| | | | 726/22 |
| 2019/0129736 A1* | 5/2019 | Adler | G06F 21/6209 |
| 2021/0097037 A1 | 4/2021 | Babol | |
| 2021/0373861 A1 | 12/2021 | Parthasarathy | |

* cited by examiner

SOFTWARE DISCOVERY WITHIN SOFTWARE PACKAGING AND DEPLOYMENT SYSTEMS

BACKGROUND

The present invention relates generally to the field of computer software, and more particularly to, discovering computer software contained within software packaging and deployment systems.

Software comprises the entire set of programs, applications, procedures, and routines associated with the operation of a computer system. Software asset management and software discovery tools can be used to discover software installed on a device, virtual machine, or within containers.

SUMMARY

According to one embodiment of the present invention, a computer-implemented method for software detection is disclosed. The computer-implemented method includes scanning a list of file systems present on a computer system and described by a respective mount point for a signature from a set of predetermined signatures. The computer-implemented method further includes responsive to detecting the signature from the set of predetermined signatures, selecting a particular plugin from a predetermined list of plugins based, at least in part, on the detected signature. The computer-implemented method further includes querying, using the plug-in, an operating environment of the filesystem for data indicative of software running in the operating environment. The computer-implemented method further includes determining software running in the operating environment based, at least in part, on the data returned from querying the operating environment of the filesystem.

According to another embodiment of the present invention, a computer program product for software detection is disclosed. The computer program product includes one or more computer readable storage media and program instructions stored on the one or more computer readable storage media. The program instructions include instructions to scan a list of file systems present on a computer system and described by a respective mount point for a signature from a set of predetermined signatures. The program instructions further include instructions to responsive to detecting the signature from the set of predetermined signatures, select a particular plugin from a predetermined list of plugins based, at least in part, on the detected signature. The program instructions further include instructions to query, using the plug-in, an operating environment of the filesystem for data indicative of software running in the operating environment. The program instructions further include instructions to determine software running in the operating environment based, at least in part, on the data returned from querying the operating environment of the filesystem.

According to another embodiment of the present invention, a computer system for software detection is disclosed. The computer system includes one or more computer processors, one or more computer readable storage media, and computer program instructions, the computer program instructions being stored on the one or more computer readable storage media for execution by the one or more computer processors. The program instructions include instructions to scan a list of file systems present on a computer system and described by a respective mount point for a signature from a set of predetermined signatures. The program instructions further include instructions to respon- sive to detecting the signature from the set of predetermined signatures, select a particular plugin from a predetermined list of plugins based, at least in part, on the detected signature. The program instructions further include instructions to query, using the plug-in, an operating environment of the filesystem for data indicative of software running in the operating environment. The program instructions further include instructions to determine software running in the operating environment based, at least in part, on the data returned from querying the operating environment of the filesystem.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of computer software, and more particularly to, discovering computer contained within software packaging and deployment systems.

Various software asset management/software discovery tools currently exist for discovering software installed on client devices, physical servers, virtual machines, or deployed in containers. One common method of software discovery is to build a map of available filesystems, adding any excluded directories from a predefined list or a list modified by a user, and then searching for files that match a pattern contained within a software signature or file signature associated with software or files contained within a software packaging list.

However, these systems typically perform a full file-scan of all filesystems, which is very resource intensive and time consuming. Furthermore, if the software is provided by self-contained applications (e.g., software running in a sandbox with mediated access to a host file system), the software is not listed in the software package list provided by package management tools. Moreover, scanning regular install locations (e.g., /opt or /usr) is both time and resource consuming, and has a high likelihood of failure due to the lack of associated package lists.

Embodiments of the present invention provide a way to discover software running on a system that is difficult to detect. For example, software applications running in an isolated sandbox environment. Embodiments of the present invention avoid scanning the entire computer system, and instead first scan the different filesystems on the computer system for particular signatures of isolated environments, followed by a detailed analysis of the identified filesystem with an isolated environment on it.

Embodiments of the present invention scan a list of filesystems present on the computer system and described by a respective mount point for signatures indicative of at least one isolated environment running on a filesystem. Upon detecting at least one signature indicative of an isolated environment, the detected filesystem is selected for further scanning. Based on the further scanning, an appropriate plugin is selected from a predetermined list of plugins, as well as the appropriate plugin configured to query the detected isolated environment. Based on the output of the appropriate plugin, a list of software running within the isolated environment is compiled.

Embodiments of the present invention solve this problem by checking and scanning the install location, or precise filesystem location, to determine one or more installed software. Embodiments of the present invention further recognize it is very time and resource consuming to do a full file scan and instead scan a precise filesystem location. Embodiments of the present invention determine a file system to query and then run a scan, instead of running a full file system scan. Without a need for running a full file scan of a file system of the operating environment. Embodiments of the present invention first determine the particular file system running on the operating system and then select a plugin for a simple scanner to query information to determine a particular software installed on the system without scanning all file systems. Embodiments of the present invention query the particular file system based on the plug in and discover information on software installed without scanning all the files.

Embodiments of the present invention recognize current software detection methods lack the ability to detect software that was installed and deleted. For example, if a software scan is done every Sunday, and a user installs a software on a Monday and deletes the software on Friday, it would not be detected by most current software detection methods.

Embodiments of the present invention provide a straightforward way of discovering software installed, without the need for running a full file-scan of all filesystems. Embodiments of the present invention use a simple scanner capable of firstly determining if such system is used on the operating system at all. If software installed on a system is detected, a plugin from a set of the provided plugins that is associated with the system is loaded in order to query the relevant system and return data. In some embodiments, such data is then used to create xml files containing a set of discovered software. Embodiments of the present invention are able to discover software without the need for using a file system scan and despite it not being present in the output of a regular system package manager.

According to one embodiment of the present invention, software that is installed on a system is discovered without the need for running a full file-scan of all detected filesystems. A file system scanner (e.g., Common Inventory Tool or CIT) is replaced with a simple scanner that is capable of determining whether a particular file system is running on an operating system. After detecting the particular file system running on the operating system, a plugin is selected from a set of available plugins and loaded in order to allow the simple scanner or another computing device to query the detected filesystem to return the required data necessary to determine the particular software installed on the operating system or software that may be running in an isolated environment. The returned data is then used to create xml files that include a list of one or more detected software. In this way, software installed on a system is able to be discovered without the need for using a file system scanner or performing a full file system scan, as well in those instances when the software is not provided by a regular system package manager.

According to another embodiment of the present invention, the presence of a software package or package (i.e., a compressed file archive containing all of the files that come with a particular application) is confirmed by a simple scanner. A particular plug-in associated with the detected package is loaded and used to execute queries against a packaging system associated with the detected package in order to return a list of installed software. The list of installed software is compared with a list of licensed software (e.g., a list of software provided in a software catalog associated with a particular application) to determine which particular installed software does not corresponding to the original software corresponding to an application and which particular installed software is not part of the original software corresponding to the application.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
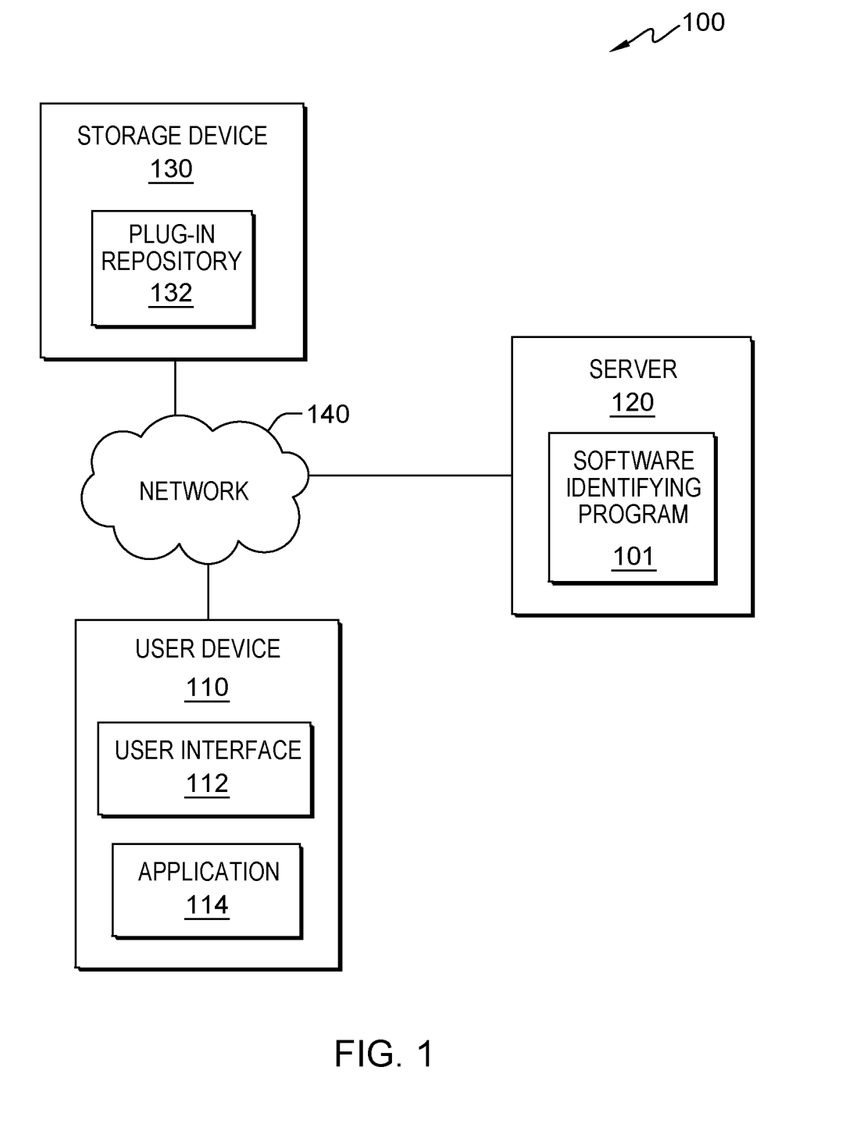
FIG. 1 is a block diagram of a network computing environment, generally designated 100, suitable for operation of a software identifying program 101 in accordance with at least one embodiment of the present invention.

The present invention will now be described in detail with reference to the Figures. FIG. 1 is a functional block diagram of a network computing environment, generally designated 100, suitable for operation of a software identifying program 101 in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130, and other devices (not depicted) via a network, such as network 140. User device 110 can include internal and external hardware components, as depicted and described in further detail with respect to computer 400 depicted in FIG. 4.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user interface 112 displays installed software detected by software identifying program 101.

Application 114 can be representative of one or more applications (e.g., an application suite) that operate on user device 110. In an embodiment, application 114 is representative of one or more applications (e.g., social media applications, web applications, email applications, etc.) located on user device 110. In an embodiment, an application comprises any software application installed on a computing system, such as user device 110 or server 120. In an embodiment, application 114 can be a client-side application associated with a server-side application running on server 120 (e.g., a client-side application associated with software identifying program 101). In an embodiment, application 114 can operate to perform processing steps of software identifying program 101 (i.e., application 114 can be representative of software identifying program 101 operating on user device 110).

Server 120 is configured to provide resources to various computing devices, such as user device 110. For example, server 120 may host various resources, such as individual software or software packages accessed and utilized by various computing devices, such as user device 110, and software identifying program 101. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g., database server computer, application server computer, web server computer, webmail server computer, media server computer, etc.) that act as a single pool of seamless resources when accessed within network computing environment 100.

In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

Figure 4:
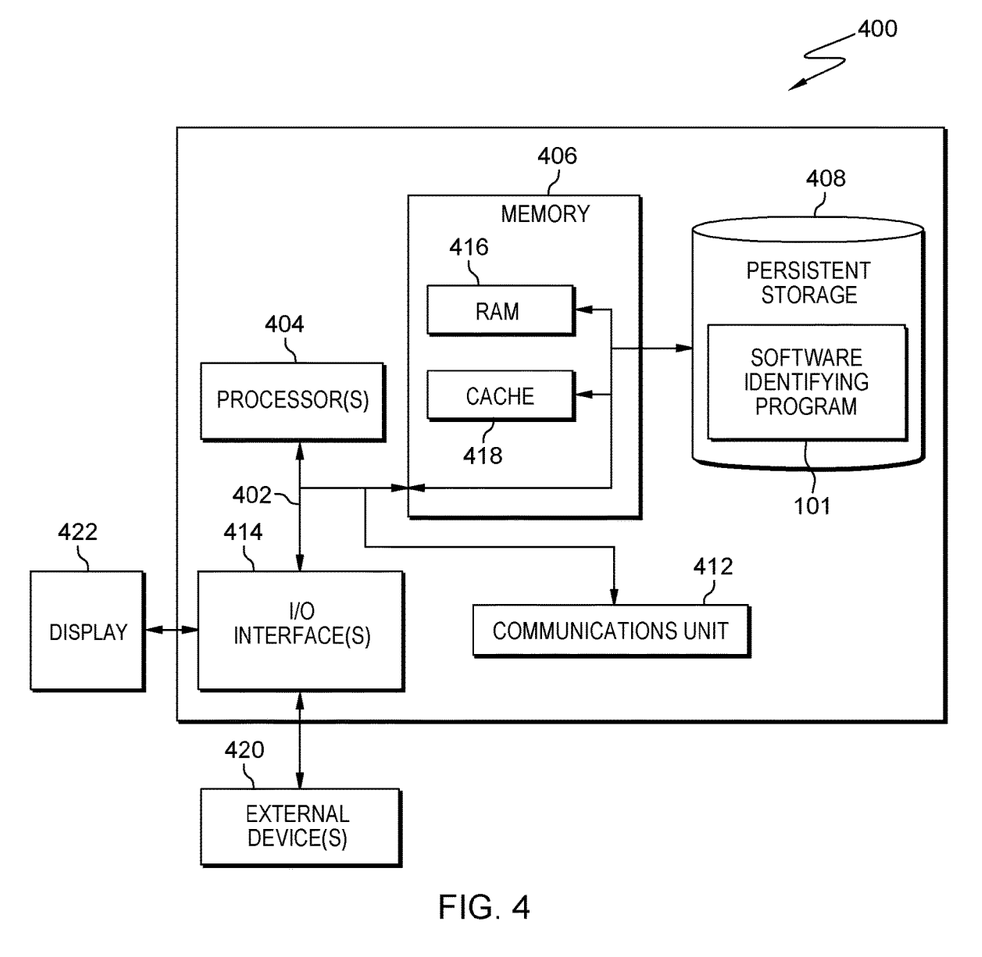
FIG. 4 is a block diagram depicting components of a computer, generally designated 400, suitable for executing a software identifying program 101 in accordance with at least one embodiment of the present invention.
Figure 5:
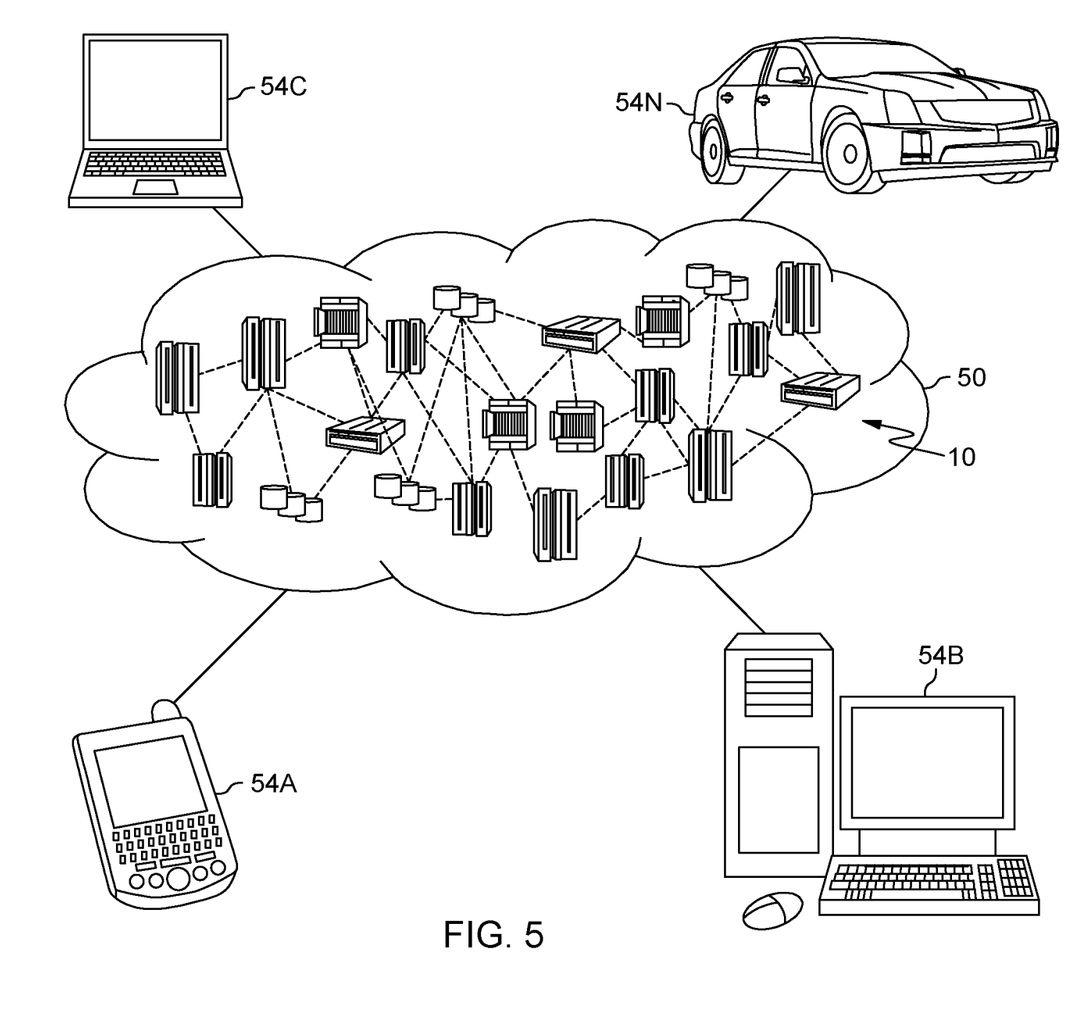
FIG. 5 is a block diagram depicting a cloud computing environment 50 in accordance with at least one embodiment of the present invention.

Server 120 may include components as depicted and described in detail with respect to cloud computing node 50, as described in reference to FIG. 5, in accordance with at least one embodiment of the present invention. Server 120 may include components, as depicted and described in detail with respect to computer 400 as described in reference to FIG. 4, in accordance with at least one embodiment of the present invention.

In various embodiments, storage device 130 is a secure data repository for persistently storing plug-in repository 132 utilized by software identifying program 101 for detecting software installed on or otherwise utilized by various computing devices within various computing environments. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment plug-in repository 132 includes a set of plug-ins (i.e., add-ons or extensions) available for use by software identifying program 101 to scan and query various computing systems in order to determine information associated with software installed thereon. In an embodiment, a plug-in is a software component that adds a specific feature to an existing computer program. For example, a plug-in attaches to a host application and depends on the services provided by the host application. The plug-in allows for the addition of new functions to a host program without altering the host program itself.

In an embodiment, software identifying program 101 may be configured to access various data sources, such as software installed on various computing devices, such as user device 110 and server 120, that may include personal data, content, contextual data, or information that a user does not want to be processed. Personal data includes personally identifying information or sensitive personal information as well as user information, such as location tracking or geo-location information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, software identifying program 101 enables the authorized and secure processing of personal data. In an embodiment, software identifying program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, software identifying program 101 provides information regarding personal data and the nature (e.g., type, scope, purpose, duration, etc.) of the processing. In an embodiment, software identifying program 101 provides a user with copies of stored personal data. In an embodiment, software identifying program 101 allows for the correction or completion of incorrect or incomplete personal data. In an embodiment, software identifying program 101 allows for the immediate deletion of personal data.

In an embodiment, software identifying program 101 runs in an isolated sandbox environment. In an embodiment, software identifying program 101 first scans the different filesystems on the computer system for particular signatures of isolated environments, followed by a detailed analysis of the identified filesystem with an isolated environment on it.

In an embodiment, software identifying program 101 scans a list of one or more file systems. In an embodiment, software identifying program 101 scans a list of one or more file systems on user device 110. In an embodiment, software identifying program 101 checks and scans the install location, or precise filesystem location, to determine one or more installed software. In an embodiment, a simple file system scanner is utilized to perform the scan of the file systems. A file system or filesystem is a method and data structure that the operating system uses to control how data is stored and retrieved. A file system is a set of data structures, interfaces, abstractions, and APIs that work together to manage any type of file on any type of storage device, in a consistent manner. In an embodiment, a simple file system scanner is targeted for a specific system. Each operating system uses a particular file system to manage the files. In an embodiment, software identifying program 101 scans Linux based file systems to detect software installed on a device. However, it should be appreciated software identifying program 101 is capable of scanning any generally known file systems for discovering software installed on a device.

In an embodiment, software identifying program 101 detects one or more signatures from scanning a file system. In an embodiment, software identifying program 101 scans a filesystem for a particular signature. In an embodiment, scanning a filesystem for a particular signature includes comparing or otherwise matching signatures from a list of signatures to signatures included in filesystem data. In an embodiment, a signature is indicative of a particular software package that has been installed, upgraded, or configured and is running in the same operating environment as the file system. In an embodiment, a signature is indicative of an isolated computing environment. In an embodiment, upon detecting at least one signature indicative of an isolated environment, software identifying program 101 selects the respective file system for further scanning. In an embodiment, the detected signature is indicative of a package manager or isolated environment associated with the operating system, and wherein the plug-in is configured to query the package manager or isolated environment for data indicative of software running in the operating environment. In an embodiment, a signature is a software signature. In an embodiment, a signature is a file signature. In an embodiment, every file signature is a software signature, but every software signature is not necessarily a file signature (e.g., ISO tags). In an embodiment, software identifying program 101 determines the particular file system running on the operating system and then selects a plugin for a simple scanner to query information to determine a particular software installed on the system without scanning all file systems.

In an embodiment, software identifying program 101 selects a particular plug-in from plug-in repository 132 based on a particular software package identified. In an embodiment, a plug-in is determined by the internal commands to get the list of discovered software. In an embodiment, a plug-in allows for the user of a simple or basic file system scanner to be modified for use with a particular software package, particular packaging system, or particular packaging system environment. In an embodiment, the plug-in is loaded to existing software utilized by the simple file scanner to execute queries against a packaging system associated with the software package to return a list of installed software. In an embodiment, the plugin is configured to query at least one of the file system, the operating environment of the file system, a packaging system, and an isolated operating environment for the data indicative of software running in the operating environment.

In an embodiment, software identifying program 101 queries a relevant system and returns data. In an embodiment, software identifying program 101 configures the attached plug-in to query a detected isolated environment. In an embodiment, software identifying program 101 queries the particular file system based on the plug in to determine one or more installed software. In an embodiment, software identifying program 101 receives a list of installed software in response to querying the system. In an embodiment, software identifying program 101 executes a query against a packaging system associated with an identified software package to return a list of the installed software. In an embodiment, software identifying program 101 determines a package list. A package list is the output of programs installed generated by the package managers commonly used by most, but not all, Linux distributions. The limitation is the lack of information about programs installed via other methods than using package manager (such as zypper, pacman, apt, dnf, portage). Package managers are commonly used by Linux distributions but are also available for *BSD systems or OS/X (homebrew). The packaging list is a simple, plain text list of programs (or packages). An exemplary list is as follows:

cyrus-sasl-lib-2.1.27-5.e18.x86_64
pcp-pmda-oracle-5.1.1-4.e18_3.x86_64
urw-base35-d0500001-fonts-20170801-10.e18.noarch In an embodiment, software identifying program 101 compares the received list of installed software with a software catalog list. In an embodiment, the software catalog list is a list of licensed software. In an embodiment, a software catalog is a document used to store knowledge base data and share it between different applications or between different instances of the knowledge base. For example, a software catalog is imported or uploaded or shared from an application. A software catalog contains information used to help analyze the structure of software bundles and determine the licensing dependencies between the enclosing software and its bundled products and components.

In an embodiment, software identifying program 101 compares the list of installed software to the licensed software received from the software catalog to determine one or more discovered installed software. In an embodiment, software identifying program 101 compares the package list and the catalog list to determine one or more installed software. In an embodiment, software identifying program 101 determines, based on the comparison, particular software running in the operating environment associated with the list of licensed software. In an embodiment, software identifying program 101 determines, based on the comparison, particular software running in the operating environment that is not associated with the list of licensed software.

In an embodiment, software identifying program 101 generates a list or file listing the one or more detected matching installed software. In an example, the generated list is in xml or PDF format.

In an embodiment, software identifying program 101 uploads the generated list of installed software to a database or central server. In an embodiment, software identifying program 101 uploads the generated list of installed software to a software asset management system. In an embodiment, software identifying program 101 displays the generated list of installed software on user device 110. In an embodiment, software identifying program 101 uploads a list including the particular software running in the operating environment that is not associated with the list of licensed software for further processing.

Figure 2:
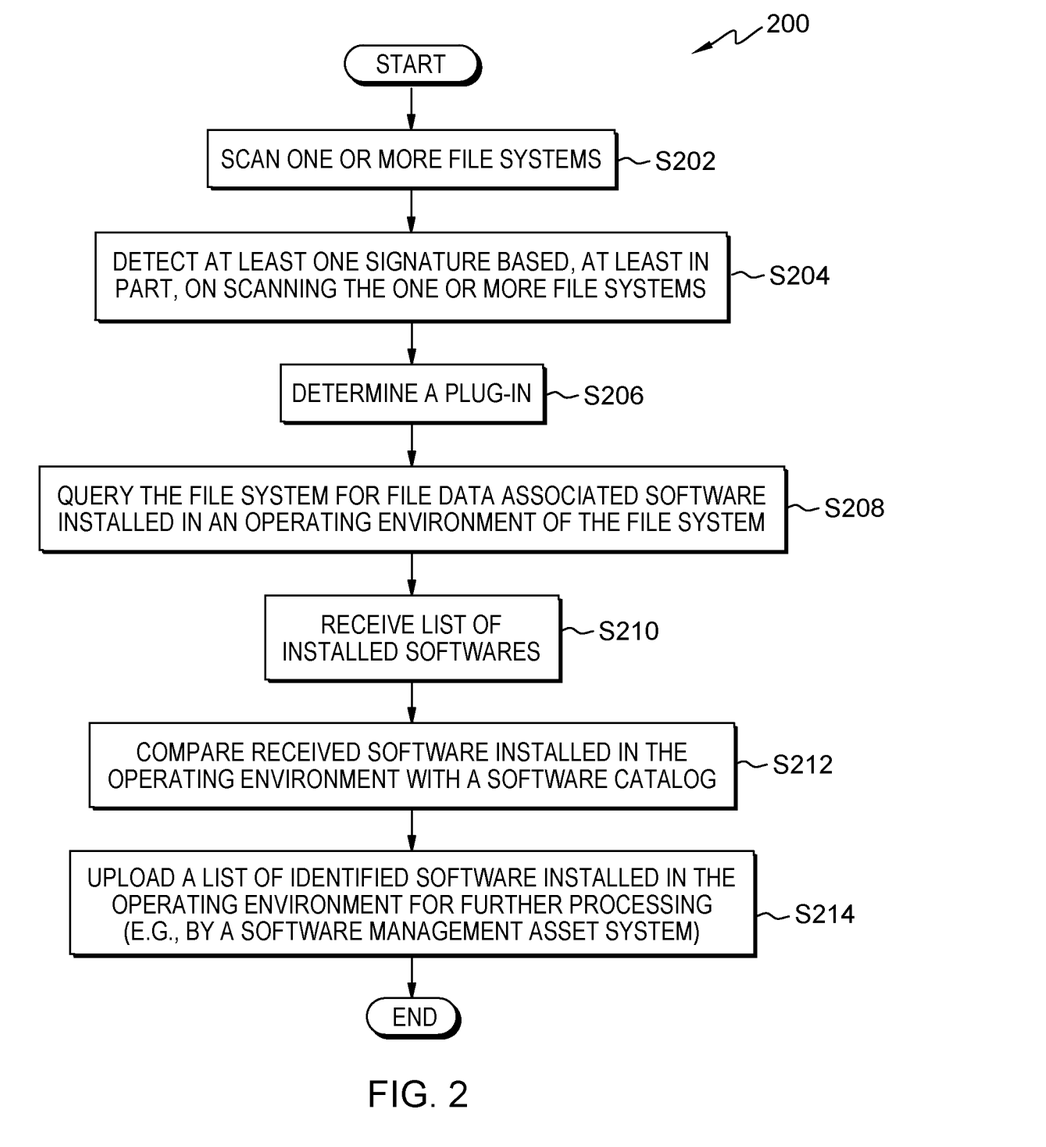
FIG. 2 is a flow chart diagram depicting operational steps for a software identifying program 101, generally designated 200, in accordance with at least one embodiment of the present invention.

FIG. 2 is a flow chart diagram depicting operational steps for a software identifying program 101, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, software identifying program 101 scans one or more file systems.

At step S204, software identifying program 101 detects at least one signature based, at least in part, on scanning the one or more file systems.

At step S206, software identifying program 101 determines a plug-in. In an embodiment, software identifying program 101 determines a plug-in based, at least in part, on a particular file system identified. In an embodiment, the software identifying program 101 determines a plug-in based, at least in part, on a particular detected signature.

At step S208, software identifying program 101 queries the file system for file data associated software installed in an operating environment of the file system. In an embodiment, software identifying program 101 loads the plug-in in order to query the file system running in the particular operating environment.

At step S210, software identifying program 101 receives a list of installed software. In an embodiment, software identifying program 101 executes a query against used packaging system that returns a list of the installed software running in the operating environment of the file system.

At step S212, software identifying program 101 compares received software installed in the operating environment with a software catalog. In an embodiment, software identifying program 101 compares the list of installed software to the licensed software received from the software catalog to determine one or more discovered installed software. In an embodiment, software identifying program 101 compares the package list and the catalog list to determine one or more installed software.

At step S214, software identifying program 101 uploads a list of identified software installed in the operating environment for further processing (e.g., by a software management asset system).

Figure 3:
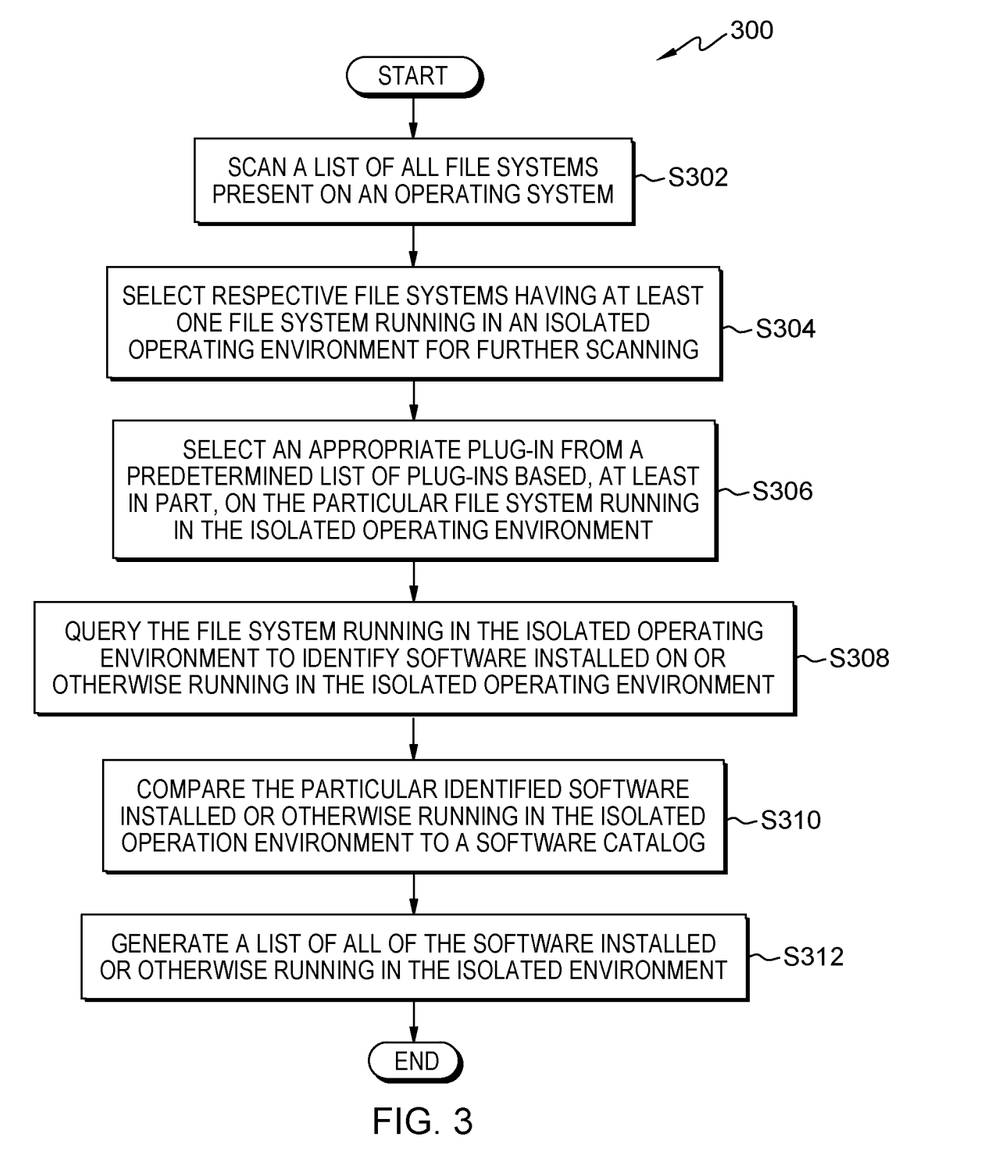
FIG. 3 is a flow chart diagram depicting operational steps for a software identifying program 101, generally designated 300, in accordance with at least one embodiment of the present invention.

FIG. 3 is a flow chart diagram depicting operational steps of software identifying program 101, generally designated 300, in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S302, software identifying program 101 scans a list of all filesystems present on an operating system. In an embodiment, scanning the filesystems includes scanning filesystems for a particular signature. In an embodiment, scanning the list of filesystems includes scanning filesystems described by a respective mount point for signatures indicative of at least one filesystem running in an isolated operating environment. In an embodiment, scanning the filesystems includes detecting filesystems running in an isolated operating environment. In an embodiment, scanning the file systems includes scanning file systems for a signature associated with a particular package manager running in the same environment as the file system.

At step S304, software identifying program 101 selects respective filesystems having at least one filesystem running in an isolated operating environment for further scanning.

At step S306, software identifying program 101 selects an appropriate plugin from a predetermined list of plugins based, at least in part, on the particular filesystem running in the isolated operating environment. In an embodiment, the isolated operating environment is a container, such as a Docker container. In an embodiment, the isolated operating environment is a sandbox. In an embodiment, the appropriate plug-in is selected from a list of available plug-ins. In an embodiment, the appropriate plug-in is loaded by a simple file system scanner in order to configure simple file system scanner to query the file system running in the detected isolated operating environment. In an embodiment, software identifying program 101 attaches the determined plug-in. In an embodiment, software identifying program 101 executes a query against used packaging system that returns a list of the installed software. In an embodiment, software identifying program 101 selects a particular plug-in based on the detected package manager running in the same environment as the detected file system.

At step S308, software identifying program 101 queries the file system running in the isolated operating environment to identify software installed on or otherwise running in the isolated operating environment. In an embodiment, software identifying program 101 determines the particular software installed on or otherwise running in the isolated operating environments based on querying the file system. In an alternative embodiment, software identifying program 101 queries the package manager running in the same environment as the file system. In an embodiment, software identifying program 101 determines the particular software installed on or otherwise running in the isolated operating environment based on querying the package manager.

At step S310, software identifying program 101 compares the particular identified software installed or otherwise running in the isolated operation environment to a software catalog. For example, the software catalog is a licensed list of software provided by a particular package management system or software provider. In an embodiment, software identifying program 101 compiles a list of software running within the isolated environment based on the output of the appropriate plugin. In an embodiment, comparing the installed software to the software catalog includes identifying particular installed software included in the software catalog. In an embodiment, comparing the software to the software catalog includes identifying particular installed software that is not included in the software catalog.

At step S312, software identifying program 101 generates a list of all of the software installed or otherwise running in the isolated environment. For example, an xml list containing all of the identified installed software is created. In an embodiment, the list of installed software is uploaded for additional processing (e.g., by a software asset management system).

FIG. 4 is a block diagram depicting components of a computing device, generally designated 400, suitable for software identifying program 101, in accordance with at least one embodiment of the invention. Computing device 400 includes one or more processor(s) 404 (including one or more computer processors), communications fabric 402, memory 406 including, RAM 416 and cache 418, persistent storage 408, which further includes software identifying program 101, communications unit 412, I/O interface(s) 414, display 422, and external device(s) 420. It should be appreciated that FIG. 4 provides only an illustration of one embodiment and does not imply any limitations with regard to the environments in which different embodiments may be implemented. Many modifications to the depicted environment may be made.

As depicted, computing device 400 operates over communications fabric 402, which provides communications between computer processor(s) 404, memory 406, persistent storage 408, communications unit 412, and input/output (I/O) interface(s) 414. Communications fabric 402 can be implemented with any architecture suitable for passing data or control information between processor(s) 404 (e.g., microprocessors, communications processors, and network processors), memory 406, external device(s) 420, and any other hardware components within a system. For example, communications fabric 402 can be implemented with one or more buses.

Memory 406 and persistent storage 408 are computer readable storage media. In the depicted embodiment, memory 406 includes random-access memory (RAM) 416 and cache 418. In general, memory 406 can include any suitable volatile or non-volatile computer readable storage media.

Program instructions for software identifying program 101 can be stored in persistent storage 408, or more generally, any computer readable storage media, for execution by one or more of the respective computer processor(s) 404 via one or more memories of memory 406. Persistent storage 408 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 can include one or more network interface cards. Communications unit 412 may provide communications through the use of either or both physical and wireless communications links. In the context of some embodiments of the present invention, the source of the various input data may be physically remote to computing device 400 such that the input data may be received, and the output similarly transmitted via communications unit 412.

I/O interface(s) 414 allows for input and output of data with other devices that may operate in conjunction with computing device 400. For example, I/O interface(s) 414 may provide a connection to external device(s) 420, which may be as a keyboard, keypad, a touch screen, or other suitable input devices. External device(s) 420 can also include portable computer readable storage media, for example thumb drives, portable optical or magnetic disks, and memory cards. Software and data used to practice embodiments of the present invention can be stored on such portable computer readable storage media and may be loaded onto persistent storage 408 via I/O interface(s) 414. I/O interface(s) 414 also can similarly connect to display 422. Display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
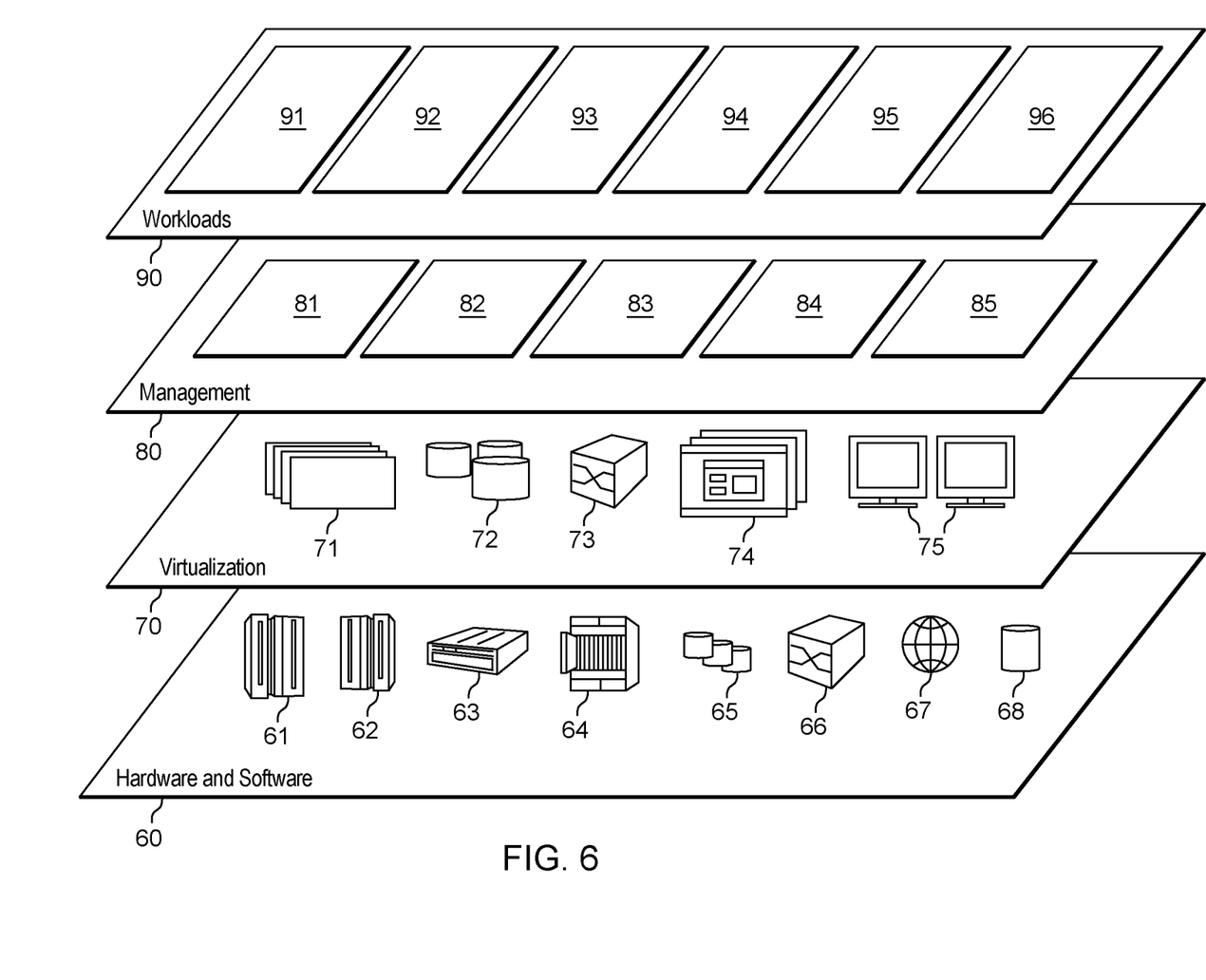
FIG. 6 is block diagram depicting a set of functional abstraction model layers provided by cloud computing environment 50 depicted in FIG. 5 in accordance with at least one embodiment of the present invention.

FIG. 6 is block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software identifier 96.

What is claimed is:

1. A computer-implemented method for software detection, the computer-implemented method comprising:
    scanning a list of file systems present on a computer system and described by a respective mount point for a signature from a set of predetermined signatures;
    responsive to detecting the signature from the set of predetermined signatures, selecting a particular plugin from a predetermined list of plugins based, at least in part, on the detected signature;

querying, using the plug-in, an operating environment of a file system for data indicative of software running in the operating environment;

determining software running in the operating environment based, at least in part, on the data returned from querying the operating environment of the file system; and wherein the detected signature is indicative of an isolated environment running in the operating environment, and wherein the plug-in is configured to query the isolated environment for data indicative of software running in the isolated environment.

2. The computer-implemented method of claim 1, further comprising:

comparing the determined software running in the operating environment to a list of licensed software included in a software catalog;

determining, based on the comparison, particular software running in the operating environment associated with the list of licensed software; and determining, based on the comparison, particular software running in the operating environment that is not associated with the list of licensed software.

3. The computer-implemented method of claim 2, further comprising:

uploading a list including the particular software running in the operating environment that is not associated with the list of licensed software for further processing.

4. The computer-implemented method of claim 1, wherein the plugin is configured to query at least one of the file system, the operating environment of the file system, a packaging system, and an isolated operating environment for the data indicative of software running in the operating environment.

5. The computer-implemented method of claim 1, wherein the one or more signatures are indicative of at least one type of signature selected from the group consisting of an isolated environment signature, a file system signature, a software package manager signature, a software package signature, a software signature, and a file signature.

6. The computer-implemented method of claim 1, wherein the detected signature is indicative of a package manager associated with the operating system, and wherein the plug-in is configured to query the package manager for data indicative of software running in the operating environment.

7. A computer program product for software detection, the computer program product comprising one or more computer readable storage media and program instructions stored on the one or more computer readable storage media, the program instructions including instructions to:

scan a list of file systems present on a computer system and described by a respective mount point for a signature from a set of predetermined signatures;

responsive to detecting the signature from the set of predetermined signatures, select a particular plugin from a predetermined list of plugins based, at least in part, on the detected signature;

query, using the plug-in, an operating environment of a file system for data indicative of software running in the operating environment;

determine software running in the operating environment based, at least in part, on the data returned from querying the operating environment of the file system; and wherein the detected signature is indicative of an isolated environment running in the operating environment, and wherein the plug-in is configured to query the isolated environment for data indicative of software running in the isolated environment.

8. The computer program product of claim 7, further comprising instructions to:

compare the determined software running in the operating environment to a list of licensed software included in a software catalog;

determine, based on the comparison, particular software running in the operating environment associated with the list of licensed software; and determine, based on the comparison, particular software running in the operating environment that is not associated with the list of licensed software.

9. The computer program product of claim 8, further comprising instructions to:

upload a list including the particular software running in the operating environment that is not associated with the list of licensed software for further processing.

10. The computer program product of claim 7, wherein the plugin is configured to query at least one of the file system, the operating environment of the file system, a packaging system, and an isolated operating environment for the data indicative of software running in the operating environment.

11. The computer program product of claim 7, wherein the one or more signatures are indicative of at least one type of signature selected from the group consisting of an isolated environment signature, a file system signature, a software package manager signature, a software package signature, a software signature, and a file signature.

12. The computer program product of claim 7, wherein the detected signature is indicative of a package manager associated with the operating system, and wherein the plug-in is configured to query the package manager for data indicative of software running in the operating environment.

13. A computer system for software detection, comprising:

one or more computer processors;

one or more computer readable storage media;

computer program instructions;

the computer program instructions being stored on the one or more computer readable storage media for execution by the one or more computer processors; and the computer program instructions including instructions to:

scan a list of file systems present on a computer system and described by a respective mount point for a signature from a set of predetermined signatures;

responsive to detecting the signature from the set of predetermined signatures, select a particular plugin from a predetermined list of plugins based, at least in part, on the detected signature;

query, using the plug-in, an operating environment of a file system for data indicative of software running in the operating environment;

determine software running in the operating environment based, at least in part, on the data returned from querying the operating environment of the file system; and wherein the detected signature is indicative of an isolated environment running in the operating environment, and wherein the plug-in is configured to query the isolated environment for data indicative of software running in the isolated environment.

14. The computer system of claim 13, further comprising instructions to:

compare the determined software running in the operating environment to a list of licensed software included in a software catalog;

determine, based on the comparison, particular software running in the operating environment associated with the list of licensed software; and determine, based on the comparison, particular software running in the operating environment that is not associated with the list of licensed software.

15. The computer system of claim 14, further comprising instructions to:

upload a list including the particular software running in the operating environment that is not associated with the list of licensed software for further processing.

16. The computer system of claim 13, wherein the plugin is configured to query at least one of the file system, the operating environment of the file system, a packaging system, and an isolated operating environment for the data indicative of software running in the operating environment.

17. The computer system of claim 13, wherein the one or more signatures are indicative of at least one type of signature selected from the group consisting of an isolated environment signature, a file system signature, a software package manager signature, a software package signature, a software signature, and a file signature.

* * * * *